United States Patent Office 3,499,173
Patented Mar. 10, 1970

3,499,173
WATER CLOSETS
Gordon M. Lyall, Thornliebank, Scotland, assignor to Simpson-Lawrence Limited, Glasgow, Scotland, a corporation of the United Kingdom of Great Britain and Northern Ireland
Filed June 7, 1966, Ser. No. 555,827
Claims priority, application Great Britain, Nov. 4, 1965, 46,707/65
Int. Cl. E03d 5/092, 11/10; B63b 29/14
U.S. Cl. 4—77                                      5 Claims

ABSTRACT OF THE DISCLOSURE

A water closet, especially for marine use, having a basin and a diaphragm dividing part of the casing into a soil chamber and a flushing water chamber. The soil chamber has an inlet valve for receiving soil and an outlet valve to a discharge opening. The flushing water chamber has an inlet valve for receiving fresh flushing water and an outlet valve to discharge flushing water to the main basin. An operating shaft in swingable about its axis to vibrate the diaphragm to move liquid through the soil chamber, and movable along its axis to control the valves of the flushing water chamber.

---

Figure 1:
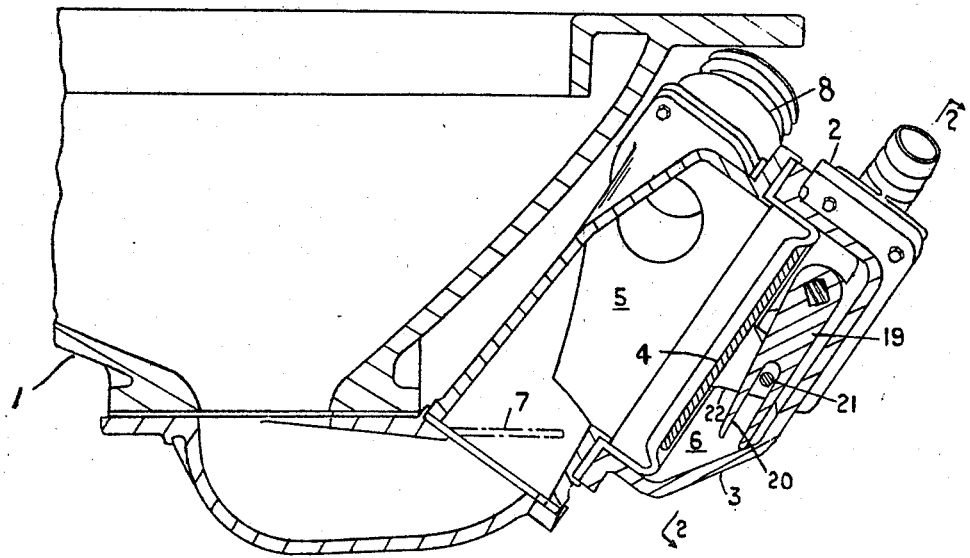

This invention relates to water closets and particularly to water closets suitable for fitting to small vessels such as yachts.

In a water closet as customarily constructed for use on a small craft there is incorporated a diaphragm pump arranged to perform a two-fold action, i.e. discharge of soil from the basin of the closet and introduction of flushing water to the basin. The pump normally incorporates on one side of the diaphragm a chamber having an inlet valve connectible to a supply of flushing water and an outlet valve connected to flushing outlets at the rim of the basin and on the other side of the diaphragm a chamber containing an inlet valve in communication with the bottom of the basin of the closet and an outlet valve connectible to a discharge opening, the diaphragm being movable by a shaft penetrating through the flushing water chamber. The pump is arranged so that the action of vibrating the diaphragm causes flushing water to be introduced into the basin at the rim and at the same time soil to be pumped from the bottom of the basin and discharged. It is sometimes desired to discharge the soil only without introducing flushing water and it is an object of the present invention to provide a water closet incorporating a pump contrived to pump soil and flushing water simultaneously or soil only yet which uses one operating shaft only.

According to the invention, a water closet having a basin formed with discharge openings at the rim incorporates a pump having a casing, a movable diaphragm located within the casing and constituting a common wall dividing the casing into two chambers, one chamber being a soil chamber and the other chamber being a flushing water chamber, an inlet valve in the soil chamber provided to control access from the bottom of the basin of the closet to the soil chamber, an outlet valve in the soil chamber provided to control a discharge opening, an inlet valve in the flushing water chamber provided to control the flow of flushing water into the flushing water chamber, an outlet valve in the flushing water chamber provided to control the flow of flushing water from the flushing water chamber to the discharge openings at the rim of the basin, and an operating shaft supported in the casing with one end projecting from the casing, the shaft being swingable about its axis and being also independently movable axially, and being so coupled to the diaphragm and so operatively engageable with the inlet valve and the outlet valve of the flushing water chamber that swinging movement of the shaft vibrates the diaphragm and axial movement of the shaft to one position causes the inlet valve of the flushing water chamber to be held closed and the outlet valve of the flushing water chamber to be held open.

The inlet valve and the discharge valve of the flushing water chamber may be flap valves and a lever having two arms one engageable with the inlet valve and the other engageable with the outlet valve may be mounted on a pivot within the flushing water chamber, said lever being engageable by an end of the operating shaft.

The operating shaft may be spring-loaded to move axially to the position in which the flushing water inlet valve is held closed and the flushing water discharge valve is held open.

The shaft may carry at the end projecting from the pump a bracket splined to the shaft to swing with the shaft and restrained against movement in a direction parallel with the axis of the shaft, an operating handle being pivoted to the bracket intermediate the ends of the handle and being pivoted at one end to the shaft.

A rocking lever formed with a radial slot may be fastened to the shaft, a pin presented by a diaphragm-operating plate being engaged with the slot in the rocking lever, the pin being long enough to remain in engagement with the slot in the rocking lever irrespective of the axial position of the operating shaft.

Figure 2:
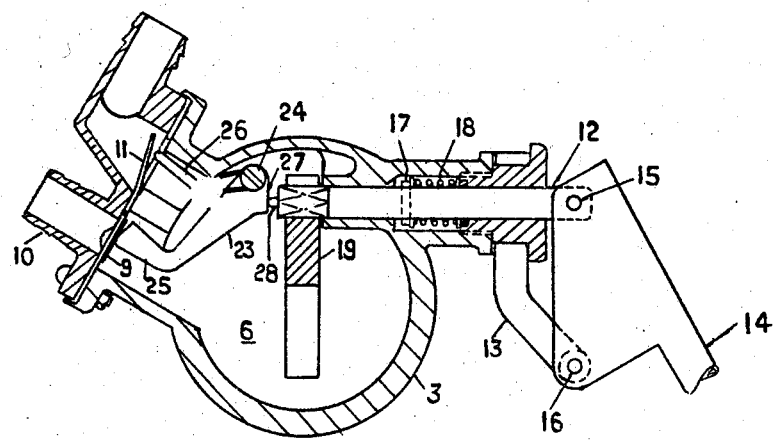

A practical embodiment of the invention is illustrated in the accompanying drawings in which FIG. 1 is a vertical section through a water closet in a plane from front to rear of the basin and FIG. 2 is a section through the pump in a plane indicated by the line 2—2 in FIG. 1.

In the drawings, 1 denotes the basin of the water closet, and 2 denotes the pump having a casing 3, a movable diaphragm 4 located within the casing 3 and dividing the casing into a soil chamber 5 and a flushing water chamber 6. 7 denotes an inlet valve in the soil chamber 5 provided to control access from the bottom of the basin 1 to the soil chamber 5, 8 denotes an outlet valve provided to control the discharge from the soil chamber 5, 9 denotes an inlet valve in the flushing water chamber provided to control the flow of flushing water through an inlet pipe 10 connectible to a source of supply of flushing water, and 11 denotes an outlet valve in the flushing water chamber 6 provided to control the outlet of flushing water to discharge openings at the rim of the basin 1. 12 denotes an operating shaft mounted in the casing 3, the shaft 12 being rotatable about its axis and being also independently movable in the axial direction. The shaft 12 carries splined thereto a bracket 13 rotatable with the shaft 12 but restrained against axial movement of the shaft. 14 denotes an operating handle pivoted at one end at 15 to the shaft 12 and also pivoted intermediate its ends at 16 to the bracket 13. The shaft 12 presents a collar 17 fixed thereto, a helical spring 18 pressing against the collar 17 being operable to urge the shaft 12 to move axially into the chamber 6. The shaft 12 carries a rocking lever 19 formed with a slot 20 engageable with a pin 21 presented by a diaphragm-operating plate 22 fixed to the diaphragm 4. 23 denotes a lever pivoted at 24 within the chamber 6 and presenting an arm 25 engageable with the inlet valve 9 and an arm 26 engageable with the outlet valve 11. The lever 23 also presents an operating surface 27 engageable by a tappet 28 on the end of the shaft 12.

In practice, the spring 18 normally holds the shaft 12 in engagement with the lever 23 so that the arms 25 and 26 of the lever 23 are pressed respectively against the flushing water inlet valve 9 to hold it closed and against the flushing water outlet valve 11 to hold it open. To and fro swinging movement of the operating handle 14 causes the shaft 12 to turn about its axis and the diaphragm 4 to vibrate. The diaphragm 4 then performs a pumping action and pumps soil from the basin 1 through the outlet valve 8 to the discharge opening. As the flushing water inlet valve 9 is held closed no flushing water can enter the flushing water chamber 6 and as the flushing water outlet valve 11 is held open air can flow in and out of the chamber 6 thus avoiding the formation of a hydraulic lock in the flushing water side of the pump. When it is desired to introduce flushing water to the basin 1 the operating handle 14 is first swung about its pivot 16 in the direction to cause the shaft 12 to move axially against the spring 18 thereby withdrawing the lever 23 from engagement with the flushing water inlet valve 9 and the flushing water outlet valve 11. Oscillatory movement of the operating handle 14 while the handle is held in its new angular position causes soil to be pumped and at the same time flushing water to be pumped. When the flushing action and the soil discharging actions are completed and the operating handle 14 is released the spring 18 returns the shaft 12 to the position in which the flushing water inlet valve 9 is held closed and the flushing water outlet valve 11 is held open so that a conscious effort is required each time it is desired to introduce flushing water into the basin during a soil discharging operation.

What is claimed is:

1. A water closet having a basin formed with discharge openings at the rim incorporating a pump having a casing, a movable diaphragm located within the casing and constituting a common wall dividing the casing into two chambers, one chamber being a soil chamber and the other chamber being a flushing water chamber, an inlet valve in the soil chamber provided to control access from the bottom of the basin of the closet to the soil chamber, an outlet valve in the soil chamber provided to control a discharge opening, an inlet valve in the flushing water chamber provided to control the flow of flushing water into the flushing water chamber, an outlet valve in the flushing water chamber provided to control the flow of flushing water from the flushing water chamber to the discharge openings at the rim of the basin, and an operating shaft supported in the casing with one end projecting from the casing, the shaft being swingable about its axis and being also independently movable axially, and being so coupled to the diaphragm and so operatively engageable with the inlet valve and the outlet valve of the flushing water chamber that oscillatory, turning movement of the shaft vibrates the diaphragm and axial movement of the shaft to one position causes the inlet valve of the flushing water chamber to be held closed and the outlet valve of the flushing water chamber to be held open.

2. A water closet as claimed in claim 1 in which the inlet valve and the discharge valve of the flushing water chamber are flap valves and a lever having two arms one engageable with the inlet valve and the other engageable with the outlet valve is pivotally mounted within the flushing water chamber, said lever being engageable by an end of the operating shaft.

3. A water closet as claimed in claim 1 in which the operating shaft is spring-loaded to move axially to the position in which the flushing water inlet valve is held closed and the flushing water discharge valve is held open.

4. A water closet as claimed in claim 1 in which a bracket is splined to the operating shaft at the end projecting from the pump and restrained against movement in a direction parallel with the axis of the shaft, and an operating handle is pivoted to the bracket intermediate the ends of the handle and is also pivoted at one end to the shaft.

5. A water closet as claimed in claim 1 in which a rocking lever formed with a radial slot is fastened to the shaft, the pump diaphragm carries a diaphragm-operating plate and a pin presented by said plate is engaged with the slot in the rocking lever, the pin being long enough to remain in engagement with the slot in the rocking lever irrespective of the axial position of the operating shaft.

References Cited

UNITED STATES PATENTS

| | | | |
|---|---|---|---|
| 591,190 | 10/1897 | MacDonald | 4—77 |
| 689,914 | 12/1901 | Sands et al. | 4—90 |
| 762,059 | 6/1904 | Hooper | 4—90 |
| 1,329,932 | 2/1920 | Sell et al. | 4—77 |
| 1,421,362 | 7/1922 | Allan | 4—90 |
| 1,650,370 | 11/1927 | Mahoney | 4—77 |
| 1,692,202 | 11/1928 | Dorsey | 184—28 |
| 1,718,985 | 7/1929 | Scoville | 184—28 |
| 1,888,842 | 11/1932 | Allan | 4—77 |
| 2,435,468 | 2/1948 | Rode et al. | 184—28 |
| 2,501,510 | 3/1950 | Gross | 4—77 |
| 2,569,928 | 10/1951 | Gonzalez | 103—2 |
| 2,886,826 | 5/1959 | Shaleen | 4—77 |
| 2,988,052 | 6/1961 | Hesse | 103—208 |

LAVERNE D. GEIGER, Primary Examiner

D. B. MASSENBERG, Assistant Examiner

U.S. Cl. X.R.

4—90